United States Patent [19]

Kinney

[11] 4,262,891
[45] Apr. 21, 1981

[54] THREE DIMENSIONAL POSITIONABLE WORKPIECE SUPPORT TABLE

[76] Inventor: Charles G. Kinney, 1991 Bethel Blvd., Boca Raton, Fla. 33432

[21] Appl. No.: 44,946

[22] Filed: Jun. 4, 1979

[51] Int. Cl.³ .............................................. B23Q 1/04
[52] U.S. Cl. ....................................... 269/71; 269/76
[58] Field of Search ................................... 269/71–73, 269/76

[56] References Cited
U.S. PATENT DOCUMENTS

| | | | |
|---|---|---|---|
| 2,668,719 | 2/1954 | Harmon | 269/71 |
| 3,693,965 | 9/1972 | Mitsengendler | 269/71 |
| 3,700,228 | 10/1972 | Peale | 269/71 |

*Primary Examiner*—Robert C. Watson
*Attorney, Agent, or Firm*—Malin & Haley

[57] ABSTRACT

A lockably positionable workpiece supporting surface for supporting and precisely but expeditiously aligning a workpiece at any desired universal angle relative to a cutting tool, said device having a fixed, three dimensional reference point in the plane of the workpiece supporting surface which allows for direct angular measurements relative to the workpiece in each plane to achieve a desired cutting angle on the workpiece.

3 Claims, 8 Drawing Figures

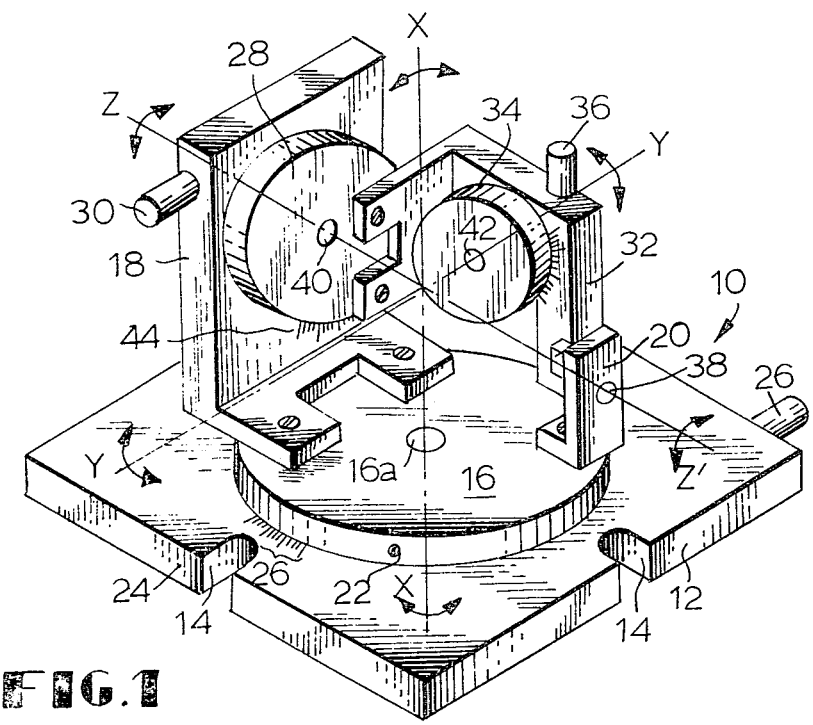
FIG.1
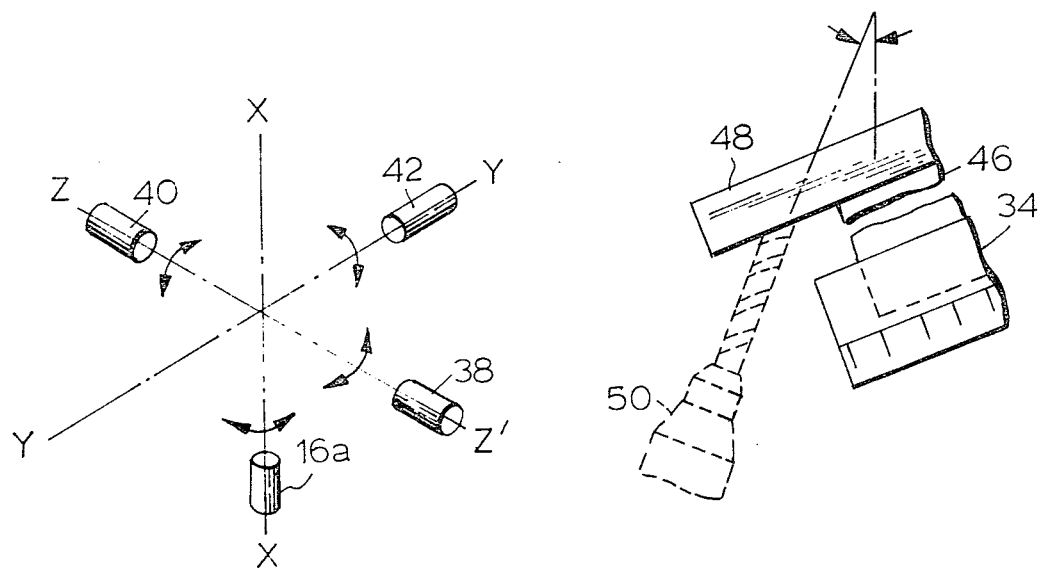
FIG.7
FIG.8

THREE DIMENSIONAL POSITIONABLE WORKPIECE SUPPORT TABLE

BACKGROUND OF THE INVENTION

This invention relates to a device for supporting and positioning a workpiece for a drilling, boring, or cutting operation at a desired angle relative to the workpiece, and particularly an improved supporting device which allows the operator to expeditiously position the workpiece with the cutting tool, without requiring additional calculations to correlate the supporting surface location to the workpiece location.

Devices have been used in the past for supporting workpieces such as metal blocks, which are bored and ground into particular devices by drills and the like. One of the most time consuming aspect of, for example, drilling a particular passage in a workpiece at a given compound angle, has been the calculations for correlating the workpiece specifications to the support surface to align the cutting tool with respect to the workpiece. It is conventional that the angular measurements given on blue prints or the like are with respect to the workpiece itself. One of the deficiencies, however, in the work support devices in the past has been that there has been no fixed reference point provided on the device for all three dimensions to allow direct correspondence between the given angular measurements of work to be performed on the workpiece and the mounting surface on the work support device. For example, U.S. Pat. No. 2,538,640, issued to A. H. Click shows a work support surface which can be adjusted in all three dimensions with the workpiece being supported above the reference axes in the device. Although reference calibration and degrees are shown for all three planes, there is no direct correlation between the location of the workpiece and all three reference axes of the device. This is especially critical when working with compound angles.

The present invention overcomes deficiencies in the prior art by providing a work supporting platform that is calibrated in all three dimensions directly with a workpiece supported thereupon which allows for angular settings on the device of the supported workpiece which are directly correspondent to a particular reference point and surface on the workpiece.

BRIEF DESCRIPTION OF THE INVENTION

A device for supporting and aligning a workpiece relative to a cutting tool, comprising a rigid, horizontal rotary table with a vertical rotary table and a support bracket to form a cradle for horizontal rotary table, vertical side walls mounted rotatably on said base and having a central rotatable axis vertically disposed, a pivotal cradle mounted axially between the vertical walls of said rotatable platform, a workpiece supporting surface rotatably mounted to said cradle, the pivotal axis of said cradle being disposed above the work support surface. Adapter plates are mounted on the work support surface, the height of the plates being such that with the adapter plates mounted thereupon, the pivotal axis of the cradle is in the plane of the upper surface of the adapter plate.

A workpiece which is a mounted on a particular adapter plate thus has its lower surface aligned with the pivotal axis of the cradle, and centrally disposed on the rotatable axes of the work support surface and the rotatable platform. Thus, the device has a fixed reference point which does not move that remains fixed relative to the movement in all three planes or all three dimensions, the fixed reference point also being in the plane of the workpiece itself. The rotatable platform, the cradle, and the workpiece supporting surface each have calibrations which represent increments for positioning each surface in a particular plane. The positioning mechanism may include manually driven gears attached to shafts which move each of the surfaces in a conventional way or hydraulic, pneumatic, electric, or any combination driving mechanism for rotating and locking each surface. Each of the surfaces representing movement in each dimension also includes a locking pin or screw to lock the particular surface at a particular calibrated position.

To operate the device, the adapter plate is placed on the work support surface, the adapter plate being of varying lengths or widths depending on the workpiece and the particular angle of access such that a workpiece is placed at the desired relationship to the fixed reference point. Each of the surfaces may then be moved in accordance with the calibrations on each surface to position the relative angle of the work support surface with respect to a tool, such as a drill, in accordance with the specification as to the operation to be done to the workpiece, the specifications being done in accordance with a particular reference point on the workpiece itself.

It is an object of this invention to provide an improved, adjustable workpiece supporting surface that allows for rapid, yet accurate positioning of a workpiece relative to a tool at any angle.

It is another object of this invention to provide an improved work support table that eliminates the need for complex calculations with respect to drawing angles and allows for rapid positioning of the machine even in using compound angles for drilling or grinding on a workpiece.

In accordance with these and other objects which will be apparent hereinafter, the instant invention will now be described with particular reference to the accompanying drawings.

BRIEF DESCRIPTION OF THE DRAWINGS

FIG. 1 shows a perspective view of one embodiment of the instant invention.

FIG. 7 shows a schematic diagram representing the axial motion presented by the instant invention.

FIG. 8 shows a fragmentary side elevational view of a workpiece being drilled from below as attached to an adaptor plate.

PREFERRED EMBODIMENT OF THE INVENTION

Figure 5:
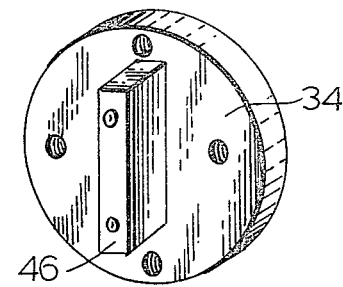
FIG. 5 shows a perspective view of the work support surface and an adaptor plate connected thereto.

Referring now to the drawings and specifically Fig. 1, the instant invention is shown generally at 10 comprised of a fixed base in a horizontally supported planar surface 12 which may be clamped down by locking members (not shown) through slots 14 to a fixed structure (not shown). The base 12 does not move in normal operation.

Mounted on base 12 rotatably (360 degrees) is a platform 16 having "L"-shaped first and second vertical side walls 18 and 20 respectively attached thereto. Platform 16 is on a rotatable axis 16a connected to the base 12 such that the platform 16 rotates in the direction of the arrows (360 degrees if desired). A base lock 22 is shown which could be in frictional engagement with platform base or an axis locking device such that once the platform 16 has been rotated to a particular angular position as determined by indicator 24 and displayed measurement increments 26, the platform 16 will be locked in place relative to base 12. Element 26 represents a motor for driving platform 16.

Vertical wall 18 is fixed to platform 16 and includes a rotatable and lockable platform 28 driven by motor 30. Platform 28 is connected on one side to cradle 32 which is pivotally mounted to vertical wall 20. The cradle 32 rotates about an axis through shafts 38 and 40. The cradle 32 further includes a rotatable and lockable workpiece support surface 34 having a central axis 42 about which it rotates, driven by motor 36. The work support surface includes grooves (not shown) which allow for the attachment of uniformly thick adaptor plates upon which the workpiece is placed. The position of the cradle 32 is determined by incremental markings 44.

Note that the pivotal axes of the cradle, which pass through axes 2-2' on each side, is spaced above that of the workpiece receiving surface 34. Also a locking device may be included for locking the cradle in a particular position.

Figure 3:
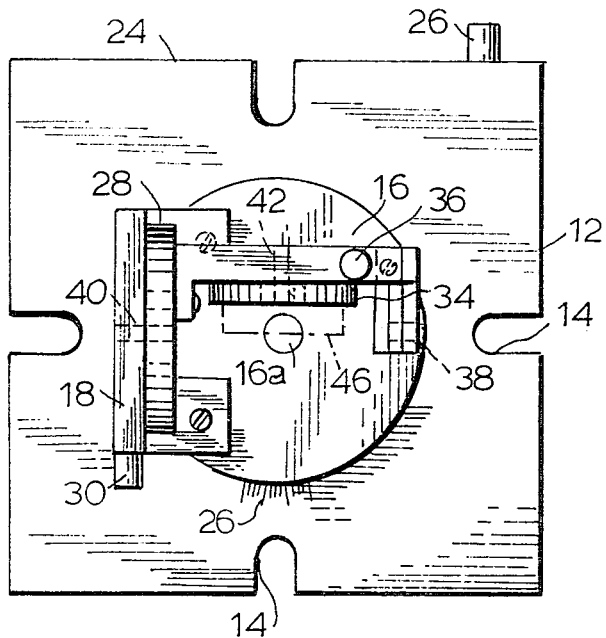
FIG. 3 shows a top plan view of the instant invention.
Figure 2:
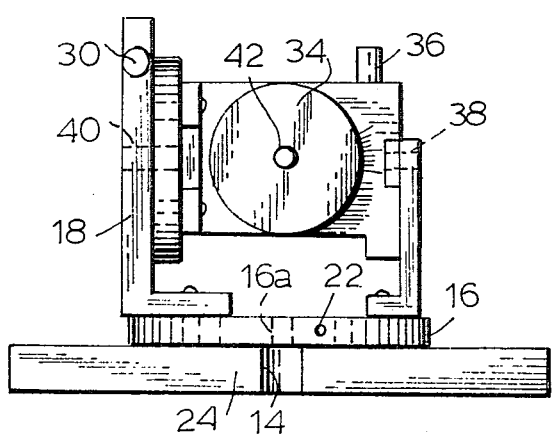
FIG. 2 shows a front elevational view of the instant invention.
Figure 4:
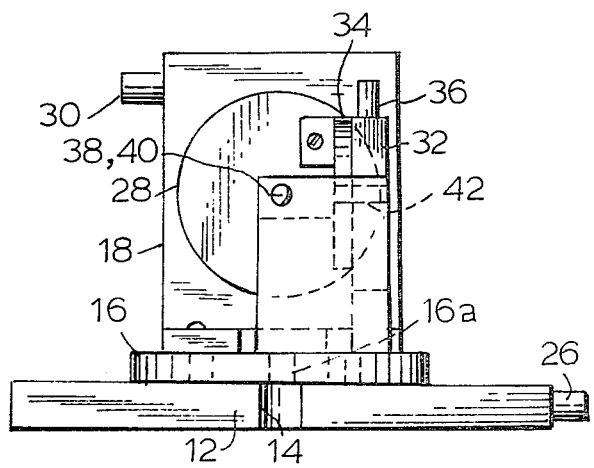
FIG. 4 shows a side elevational view of the instant invention.

FIGS. 2, 3, and 4 show the relationship of the workpiece supporting surface 34 and the axis of rotation of the cradle. FIG. 3 shows an adapter plate 46 which is attached to the work support surface 34 such that the vertical portion (the front face) of the adapter plate lies in the plane of the pivotal axis of the cradle.

Figure 6:
FIG. 6 is a top plan view of the work support surface, an adaptor plate, and a workpiece (dotted).

The combined rotational movements of all platform and and cradle contribute to provide, as shown in FIG. 7, schematic motion indicated, with all the platforms rotating about a single fixed point that passes through the pivotal axis of the cradle and the two central axes, 16a and 42, one being of the rotatable platform 16, the other the work supporting platform 34. This reference point remains fixed regardless of which particular platform or cradle is moved and to what extent. Thus, this intersection becomes a fixed reference point for the entire device. FIGS. 5 and 6 show the use of an adapter plate 46, upon which a workpiece 48 is mounted which allows for positioning of a tool 50 into areas which may overlap the top of the work supporting surface 34. The thickness of each different adaptor plate 46 is uniform (length and width may vary) such that the top surface of the adapter plate always lies in the plane of the reference axes (X, Y and Z) intersection. This insures that one surface of the work piece (the specification reference side) always is in the plane of the reference point. Thus, alternate embodiments could be constructed, where in one model the work support surface would be in the axial plane of the pivotal axis or in the preferred embodiment, the work support surface is below the axle reference plane and adapter plates of varying dimensions, length or width, are utilized, all of which have the same thickness to provide the upper surface of the adapter plate at the exact level of the axis of the cradle.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A workpiece support platform for supporting a workpiece in a lockable position for alignment with a cutting or drilling tool or the like to provide alignment with said tool with a reference point relative to the workpiece supported thereupon, comprising:

a base supporting platform;

a rotatable platform connected on top of said base platform;

a first vertical wall connected on said rotatable platform;

a second rotatable platform connected to said vertical wall;

a second vertical wall connected to said first rotatable platform;

a cradle connected on one side pivotally to said second rotatable platform, and on the opposite side pivotally to said second vertical wall;

a third rotatable platform connected to said cradle, the axis of rotation of said first platform, said second platform and said third platform intersecting at a predetermined reference point at a fixed position relative to the surface on said third platform, the third platform utilized for supporting a workpiece;

a means for driving and locking said first platform, said second platform and said third platform relative to each other to a desired rotated position; and means for measuring and indexing relative to each other, the relative movement of said first platform, said second platform and said third platform whereby a complex drilling or grinding operation may be performed on said workpiece based on measuring and indexing information relative to a single predetermined point determined with respect to said workpiece.

2. A workpiece support platform as in claim 1, wherein:

said measuring and indexing means is measured and scribed in degrees, relative to the rotatable axes of said first platform, said second platform, and said third platform.

3. A workpiece support platform as in claim 1, wherein:

said measuring and indexing means has units for use with predetermined plans such as blueprints showing operations to be performed on the workpiece relative to a single-fixed point on the workpiece, the measuring and indexing means allowing one to align the workpiece relative to the axes of said first, said second and said third platforms to correspond with the reference point on the predetermined plans.

* * * * *